No. 826,305. PATENTED JULY 17, 1906.
D. W. BROMLEY & T. E. WEST.
GATE.
APPLICATION FILED MAY 2, 1906.
3 SHEETS—SHEET 1.
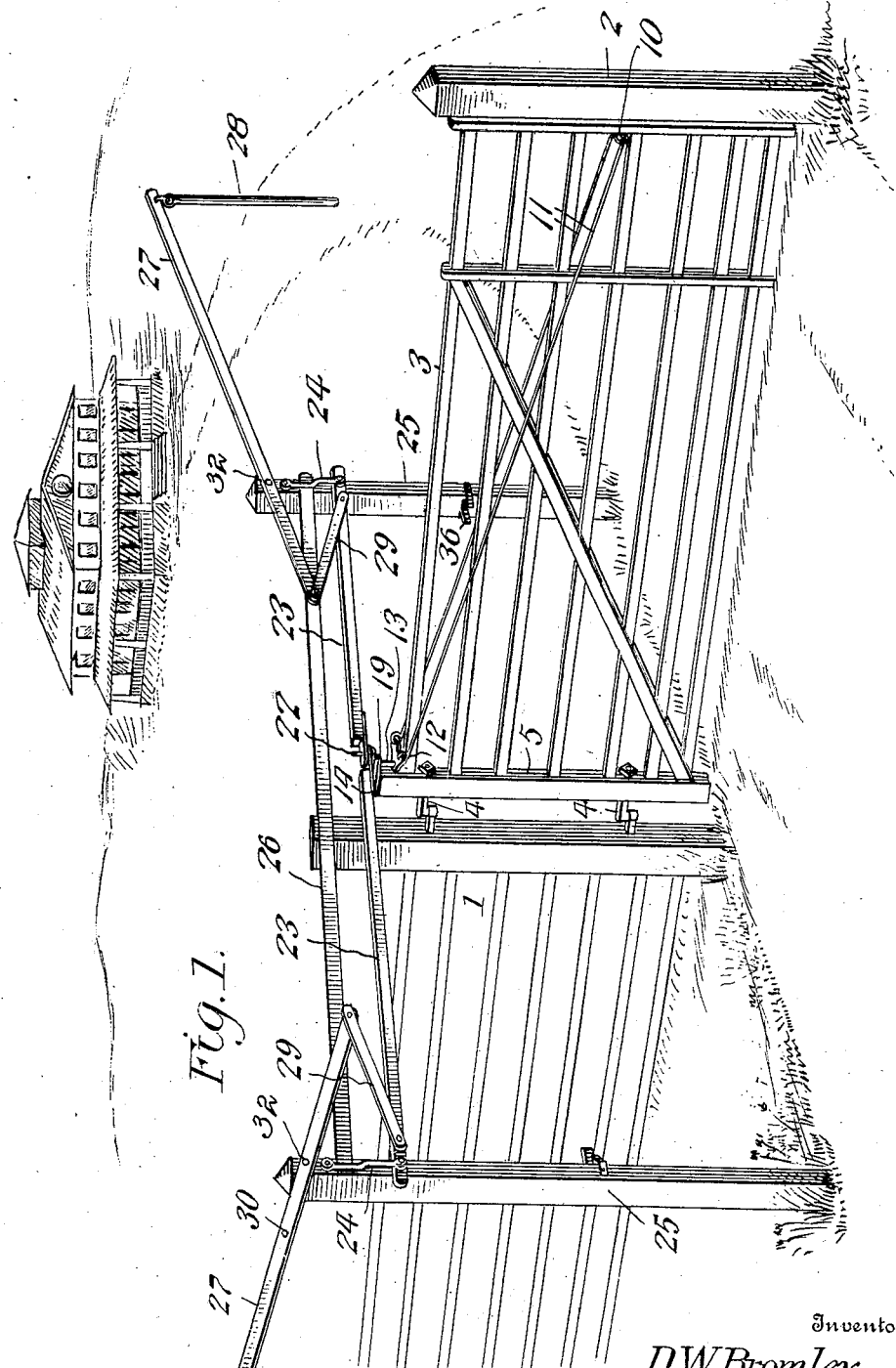
Witnesses
Inventors
D.W. Bromley
T.E. West,
By
Attorney No. 826,305. PATENTED JULY 17, 1906.
D. W. BROMLEY & T. E. WEST.
GATE.
APPLICATION FILED MAY 2, 1906.
3 SHEETS—SHEET 2.
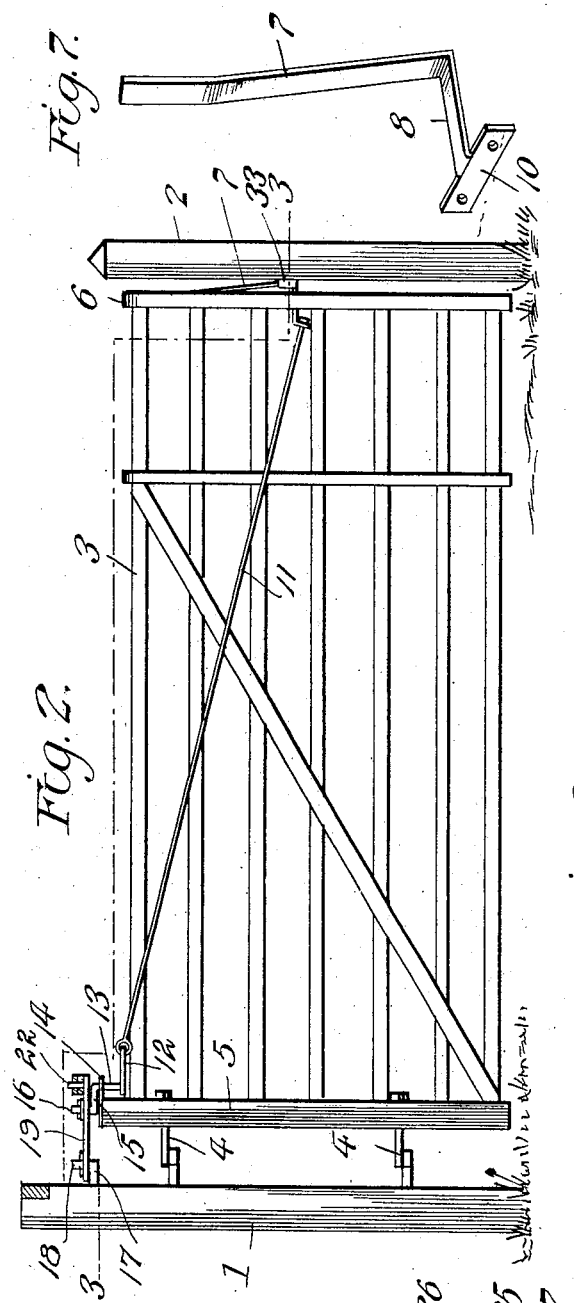
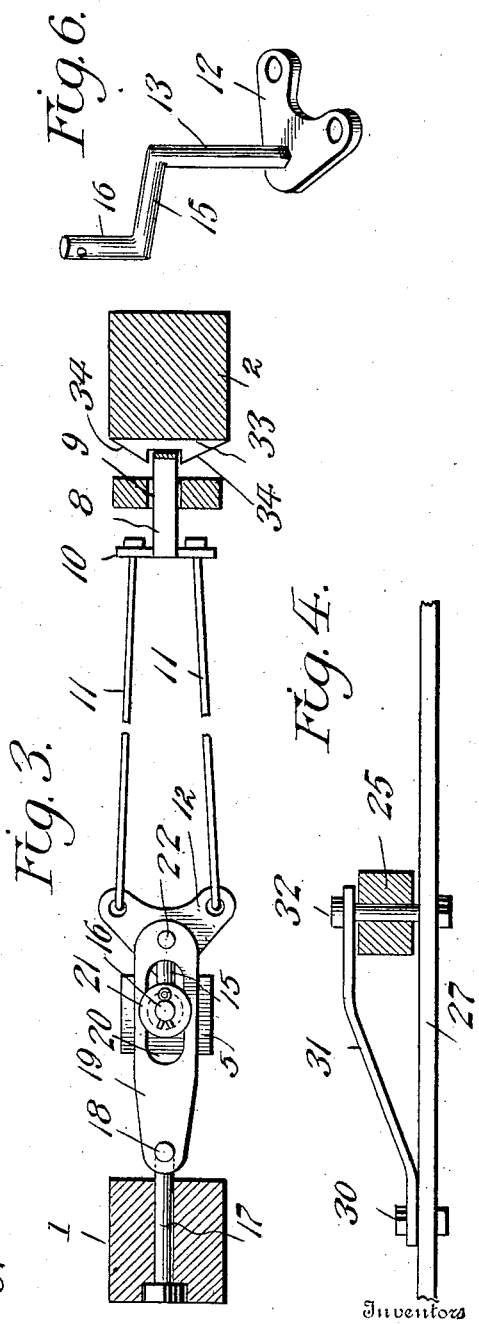
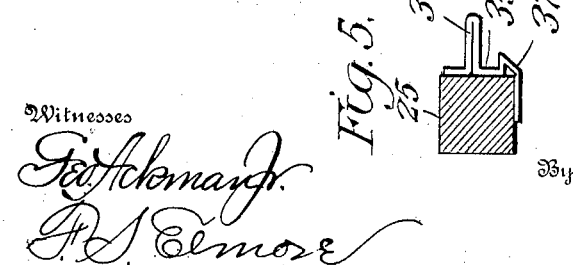
Witnesses
Geo Ackman Jr.
F. S. Elmore
Inventors
D. W. Bromley,
T. E. West
By
Victor J. Evans
Attorney
THE NORRIS PETERS CO., WASHINGTON, D. C.

No. 826,305. PATENTED JULY 17, 1906.
D. W. BROMLEY & T. E. WEST.
GATE.
APPLICATION FILED MAY 2, 1906.
3 SHEETS—SHEET 3.
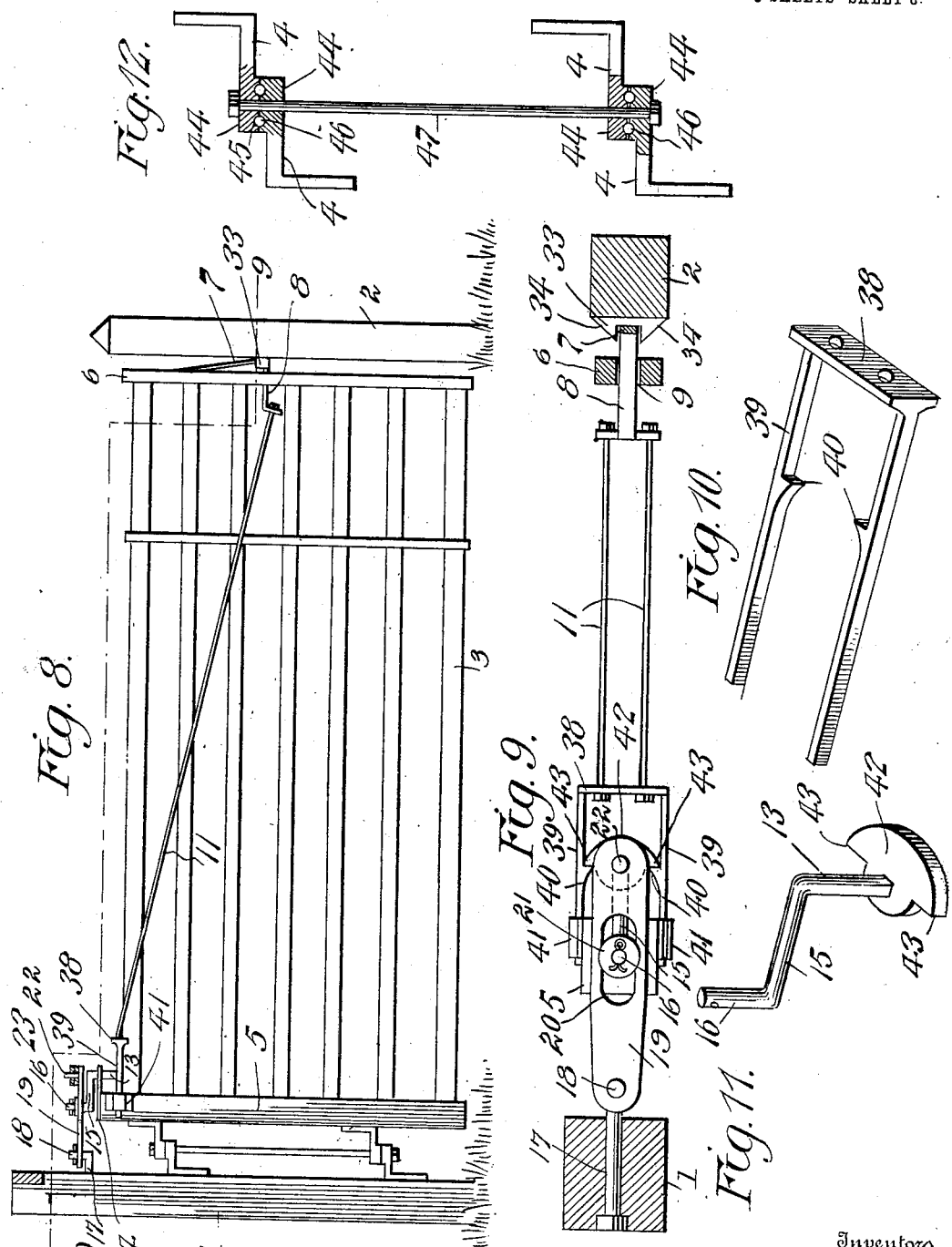
Witnesses
Geo. Ackman
F. S. Elmore
Inventors
D. W. Bromley,
T. E. West,
By Victor J. Evans
Attorney

UNITED STATES PATENT OFFICE.

DANIEL W. BROMLEY AND THOMAS E. WEST, OF NICHOLASVILLE, KENTUCKY, ASSIGNORS OF ONE-FOURTH TO J. D. COFFMAN, OF NICHOLASVILLE, KENTUCKY.

GATE.

No. 826,305.          Specification of Letters Patent.          Patented July 17, 1906.

Application filed May 2, 1906. Serial No. 314,792.

*To all whom it may concern:*

Be it known that we, DANIEL W. BROMLEY and THOMAS E. WEST, citizens of the United States, residing at Nicholasville, in the county of Jessamine and State of Kentucky, have invented new and useful Improvements in Gates, of which the following is a specification.

This invention relates to gates, being especially directed to the gate-operating mechanism, and has for its objects to produce a comparatively simple inexpensive device of a character which may be readily installed for use, one which is applicable to the various styles of gates now in vogue, and one whereby the gate may be conveniently opened or closed by a person seated in a vehicle or on horseback without dismounting.

A further object of the invention is to provide a device of this class in which the gate will be locked in open or closed position and will upon actuation of one of the traction-levers be initially released to permit of its ready movement.

With these and other objects in view the invention comprises the novel features of construction and combination of parts more fully hereinafter described.

In the accompanying drawings, Figure 1 is a perspective view of a gate equipped with an operating mechanism embodying the invention. Fig. 2 is a side elevation, partly in section, of the gate. Fig. 3 is a detail horizontal section, on an enlarged scale, taken on the line 3 3 of Fig. 2. Fig. 4 is a detail view of a portion of one of the operating-levers, showing the manner of attaching the frame to the post. Fig. 5 is a detail view of one of the auxiliary keepers with which the latch engages when the gate is in open position. Fig. 6 is a perspective view of the latch-operating head. Fig. 7 is a perspective view of the latch. Fig. 8 is a side elevation of a gate, showing a modified embodiment of the invention. Fig. 9 is a detail horizontal section, on an enlarged scale, taken on the line 9 9 of Fig. 8. Fig. 10 is a perspective view of the yoke included in the latch-operating mechanism. Fig. 11 is a perspective view of the latch-operating head. Fig. 12 is a detail side elevation, partly in section, of the modified form of hinges.

Referring to the drawings, 1 and 2 designate a pair of posts or standards spaced to form a gateway in which is hinged a gate 3, connected with the post 1 for horizontal swinging movement by means of hinge members 4 and including in its organization vertical end members or bars 5 6, there being attached to the end bar 6 a spring-latching member 7, having its free end provided with a rearwardly-extending arm 8, arranged for movement through an opening 9 in the bar and provided at its inner end with a crosspiece or head 10, with which are engaged the forward ends of a pair of rods or elements 11, disposed, respectively, on opposite sides of the gate and connected at their rear ends to the head 12 of a latch-operating member, the shaft 13 of which is journaled in a bearing-plate 14, fixed on the upper end of bar 5 and provided above the latter with a rearwardly-extending crank-arm 15, terminating in a vertical wrist-pin 16 for a purpose which will presently hereinafter appear.

Extending through the post 1 at a point in line with the upper end of bar 5 is a member or bolt 17, terminating at its outer end in a vertical pintle 18, on which is fulcrumed one end of an actuating member or lever 19, having a longitudinal guide opening or slot 20, in which the wrist-pin 16 is arranged for movement, there being journaled on the pin, and within the slot, an antifriction-roller 21, adapting the pin for free travel in the slot, while provided on the outer end of the link 19 is an uprising pintle 22, on which are pivoted the inner ends of a pair of thrust elements or bars 23, having their outer ends pivoted to links 24, in turn pivoted at their upper ends, respectively, to vertical posts or standards 25, erected at opposite sides of the gate in line with and at points suitably remote from the post 1, to which latter the upper ends of the standards are connected by a brace-bar 26.

Pivoted to each of the standards 25 is an operating-lever 27, provided at its outer end with a depending hand-piece 28 and connected at its inner end by means of a link 29 with the adjacent thrust-bar 23, there being fixed at one end to the lever, as at 30, a brace-piece 31, which engages the rear end of the pintle or bolt 32, on which the lever 27 is pivoted, and which extends transversely through the post 25 from front to rear.

Fixed upon the post 2 is a keeper 33, with which the latch 7 engages when the gate is in closed position, the keeper being provided with reversely-inclined faces 34, over which the member rides to locking position, while fixed upon each of the posts 25 is a keeper 35, having a horizontally-projecting arm or abutment 36, with which the gate contacts when in open position, and provided with an inclined face 37, over which the latching member rides for engagement with the keeper.

In practice when it is desired to open the gate the outer end of one of the operating-levers 27 is swung downward through the medium of the adjacent hand-piece 28 and serves through its link 29 to impart a forward endwise movement to the corresponding element 23, which in turn swings the actuating member or lever 19 on its pivot 18. At the beginning of its movement the member 19 acts, through its connection with the crank-arm 15, to rotate shaft 13 for turning head 12, whereby the latter will act through one of the rods 11 to move the latching member out of engagement with the keeper 33 and release the gate from post 2, whereupon further movement of the element 23 will serve, through the member 19, to swing the gate to open position. When the gate is fully opened, the latch member will engage with one of the keepers 35 for locking the gate in such condition until the gate has been passed, whereupon operation of the other lever 27 will actuate the corresponding member 23 for moving the latch to releasing position and closing the gate, it being understood that in this latter operation the foregoing steps are repeated.

In Figs. 8 to 11 there is illustrated a modified form of the device wherein the rods 11 are fixedly engaged at their rear ends with a horizontal substantially U-shaped yoke 38, the side portions or arms 39 of which are provided between their ends with inwardly-extended engaging portions or lugs 40 and are slidably disposed at their rear ends in guide-bearings 41, fixed to the side faces of the bar 5, while the shaft 13 of the latch-operating member has fixed upon its lower end a substantially semi-elliptical cam-head 42, arranged between the arms 39 and having its ends 43 disposed for engagement with the lugs 40, as seen more clearly in Fig. 9. In the operation of this form of the device when the shaft 13 is rotated through the medium of the operating-levers 27 and actuating member or lever 19, as heretofore described, the head 42 will through engagement with the lugs 40 move the yoke 38 rearwardly for exerting traction on the rods 11 to free the latch 7 from its keeper 33. When, however, the gate moves to closed position, the rods 11 and yoke 38 may move rearwardly independently of movement of the head 42, thereby permitting the latch to ride freely over the inclined faces 34 of, and for engagement with, the keeper 33.

In both forms of the device the rods 11 are adapted for independent operation by the head to move the latch to releasing position—that is, when the head is turned in one direction traction will be exerted on one of the rods and when turned in the other direction on the other rod—for moving the latch, it being noted that owing to the provision of the pair of rods having their rear ends eccentrically connected through the medium of the head with the shaft the latter will not be held on a dead-center and is therefore adapted for ready operation by the lever 19.

In Fig. 12 there is illustrated a modified form of hinge in which the hinge members 4 are formed with horizontal bearing-heads 44, having in their inner faces annular grooves or raceways 45, adapted to receive antifriction-balls 46, the upper and lower pairs of hinge members being pivotally connected by means of a common vertical pintle 47. It will be understood that in this form of the device, and owing to the provision of the antifriction-balls 46 between the hinge members, the gate is adapted for perfect freedom of movement in opening and closing.

Having thus described our invention, what we claim is—

1. In a device of the class described, a hinge-post, a gate pivotally hung thereon and having a rear end bar, a bearing-plate fixed upon the upper end of said bar, a shaft journaled wholly in said plate and having a rearwardly-extending crank-arm provided with a wrist-pin, a head fixed on the lower end of the shaft, a movable latch member carried at the forward end of the gate, a rigid connection between the head and the lower end of the latch member, an actuating-lever pivoted at its rear end to the hinge-post and between its ends on the wrist-pin, and devices connected with the forward end of the actuating-lever for operating the same to rotate the shaft.

2. In a device of the class described, a hinge-post, a gate pivotally hung thereon and having a rear end bar, a bearing-plate fixed upon the upper end of said bar, a shaft journaled wholly in said plate and having a rearwardly-extending crank-arm provided with a wrist-pin, a head fixed on the lower end of the shaft, a movable latch member carried at the forward end of the gate, a pair of rigid connections between the head and the lower end of the latch member, said connections being independently movable by the head to move the latch member to releasing position, an actuating-lever pivoted at its rear end to the hinge-post and between its ends on the wrist-pin and devices connected with the forward end of the actuating-lever for operating the same to rotate the shaft.

3. In a device of the class described, a hinge-post, a gate pivotally hung thereon, a shaft journaled at the rear end of the gate and having a rearwardly-extending crank-arm provided with a wrist-pin, a head fixed on the lower end of the shaft, a movable latch member carried at the forward end of the gate and having at its lower free end a rearwardly-extending arm provided with a cross-piece, a pair of rigid connections between the head and cross-piece, said connections being independently movable by the head for positively moving the lower free end of the latch member to releasing position, an actuating-lever pivoted at its rear end to the hinge-post and between its ends on the wrist-pin, and devices connected with the forward end of the actuating-lever for operating the same to rotate the shaft.

4. In a device of the class described, a hinge-post, a gate pivotally hung thereon and having a rear end-bar, guide-bearings fixed on said bar, a substantially U-shaped yoke having its side portions slidably mounted in said bearings and provided with inwardly-projecting lugs, a shaft journaled at the rear end of the gate and having a rearwardly-extending crank-arm provided with a wrist-pin, a head fixed on the lower end of the shaft, said head being arranged between the side portions of the yoke to act upon the lugs for moving the yoke rearwardly, a movable latch member carried at the forward end of the gate, a rigid connection between the yoke and latch member, an actuating-lever pivoted at its rear end to the hinge-post and between its ends on the wrist-pin, and devices connected with the forward end of the actuating-lever for operating the same to rotate the shaft.

In testimony whereof we affix our signatures in presence of two witnesses.

DANIEL W. BROMLEY.
THOMAS E. WEST.

Witnesses:
J. D. COFFMAN,
J. S. SMITHER.